United States Patent
Goldfinch et al.

(10) Patent No.: US 10,364,687 B2
(45) Date of Patent: Jul. 30, 2019

(54) FAN CONTAINING FAN BLADES WITH A U-SHAPED SLOT HAVING A DECREASED LENGTH PLANAR SECTION

(71) Applicant: ROLLS-ROYCE PLC, London (GB)

(72) Inventors: Keith Christopher Goldfinch, Singapore (SG); Antonios Kalochairetis, Derby (GB)

(73) Assignee: ROLLS-ROYCE plc, London (GB)

( * ) Notice: Subject to any disclaimer, the term of this patent is extended or adjusted under 35 U.S.C. 154(b) by 995 days.

(21) Appl. No.: 14/847,889

(22) Filed: Sep. 8, 2015

(65) Prior Publication Data
US 2016/0097287 A1 Apr. 7, 2016

(30) Foreign Application Priority Data
Oct. 6, 2014 (GR) .................. 20140100502

(51) Int. Cl.
*F01D 5/32* (2006.01)
*F02K 3/06* (2006.01)
*F04D 29/32* (2006.01)

(52) U.S. Cl.
CPC ............. *F01D 5/323* (2013.01); *F01D 5/326* (2013.01); *F02K 3/06* (2013.01); *F04D 29/322* (2013.01);
(Continued)

(58) Field of Classification Search
CPC . F01D 5/323; F01D 5/326; F02K 3/06; F04D 29/322; F05D 2220/36;
(Continued)

(56) References Cited

U.S. PATENT DOCUMENTS 3,295,826 A * 1/1967 Nickles .................. F01D 5/326
416/221
4,265,595 A 5/1981 Bucy, Jr. et al.
(Continued)

FOREIGN PATENT DOCUMENTS

GB 2 299 834 A 10/1996

OTHER PUBLICATIONS

Apr. 22, 2015 Search Report issued in British Patent Application No. 1419965.7.
(Continued)

*Primary Examiner* — Mark A Laurenzi
*Assistant Examiner* — Paul W Thiede
(74) *Attorney, Agent, or Firm* — Oliff PLC (57) ABSTRACT

A fan for gas turbine engine that includes hub and annular array of fan blades mounted to hub and extending radially outwardly from hub, each fan blade includes blade root. The hub includes a plurality of hub grooves having shape complimentary to shape of blade root and each hub groove receives and radially retains one blade root. A slot is provided on the suction side and on the pressure side of each blade root. Plurality of keys is provided, each key engages with slots in one blade root and with corresponding hub groove so as to axially retain fan blade. The key includes two arms and joining member, two arms are received in slots provided on blade root and joining member extends between the arms. Interface is defined between key arms and slots in blade root, and greater or equal percentage of interface is curved than is planar.

3 Claims, 7 Drawing Sheets

(52) U.S. Cl.
CPC ...... *F05D 2220/36* (2013.01); *F05D 2250/71* (2013.01); *F05D 2260/30* (2013.01); *F05D 2260/36* (2013.01); *F05D 2300/702* (2013.01)

(58) Field of Classification Search
CPC ............ F05D 2250/71; F05D 2260/30; F05D 2260/36; F05D 2300/702; B23P 9/00
USPC .................................. 416/220 R, 221, 219 R
See application file for complete search history.

(56) References Cited

U.S. PATENT DOCUMENTS

| | | | | |
|---|---|---|---|---|
| 4,527,952 | A * | 7/1985 | Forestier | ................. F01D 5/323 |
| | | | | 416/220 R |
| 5,522,702 | A | 6/1996 | Kemsley et al. | |
| 8,821,127 | B1 | 9/2014 | Knecht | |
| 2013/0183157 | A1 * | 7/2013 | Seetharaman | ............ B23P 9/00 |
| | | | | 416/219 R |

OTHER PUBLICATIONS

Prevéy, Paul S. et al. "Case Studies of fatigue life improvement using low plasticity burnishing in gas turbine engine applications," Journal of Engineering for Gas Turnbines and Power, vol. 128, No. 4, pp. 865-872, 2006.

Feb. 12, 2016 Extended Search Report issued in Eurpoean Patent Application No. 15184094.9.

* cited by examiner

FAN CONTAINING FAN BLADES WITH A U-SHAPED SLOT HAVING A DECREASED LENGTH PLANAR SECTION

FIELD OF INVENTION

The present invention relates to a fan for a gas turbine engine, a fan blade, and/or a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

The rotor of the fan can be considered to be a hub. The fan blades are connected to the hub via a blade root. The hub generally includes a plurality of axially extending grooves in the periphery of the hub to receive the roots of the fan blades. To axially retain the fan blades in the hub a shear key and shear key slot arrangement is used. The design of the shear key and shear key slot arrangement can improve accuracy of positioning of the fan blades into the hub and contribute to preventing a fan blade being released from the hub in the event of the blade being impacted, e.g. by a foreign object such as a bird.

Figure 1A:
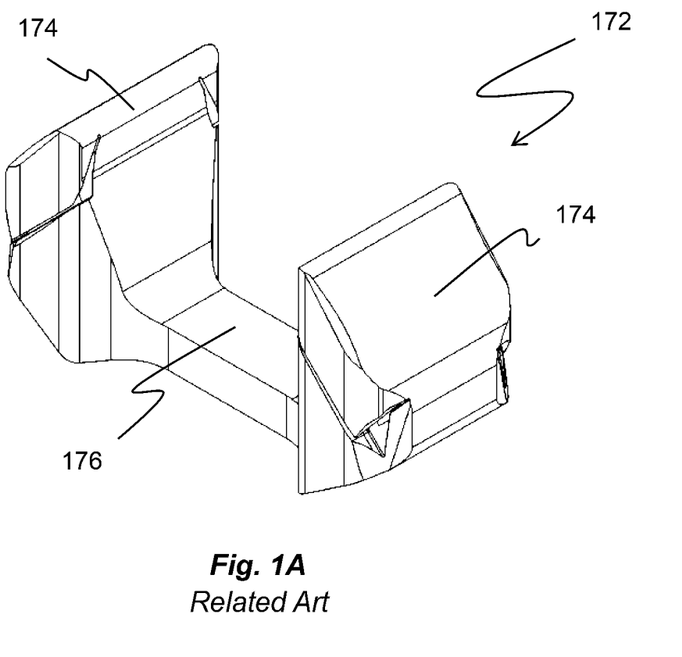
FIG. 1A illustrates a perspective view of a shear key of the prior art.
Figure 1B:
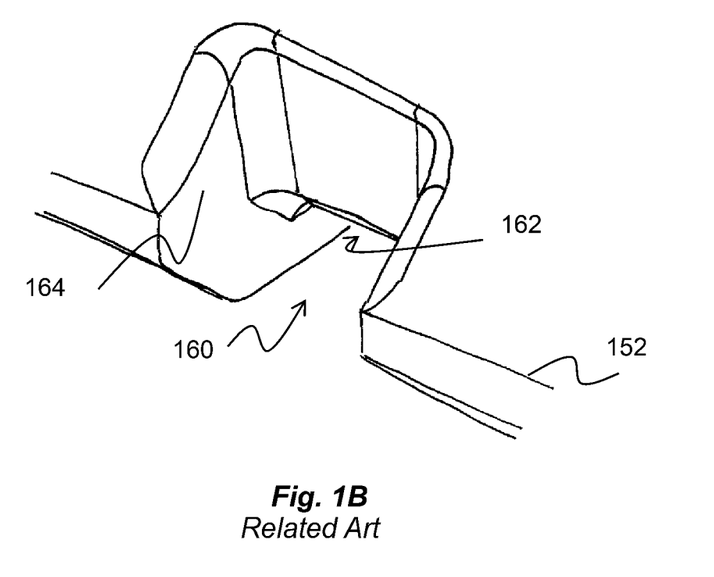
FIG. 1B illustrates a perspective view of a shear key slot in a blade root of the prior art.

An exemplary shear key 172 and shear key slot 160 is shown in FIGS. 1A and 1B. The key locates in the shear key slot provided in the blade root 152. One slot is located each side of the root so that each slot portion receives one arm of the key. An undercut 162 is provided in the base of the root portion to receive the bridging portion (or joining member) 176 of the key which interconnects its arms 174. The groove in the hub which receives the fan blade root is also provided with two generally radially extending slots. The axial extent of each of the slots in the groove of the hub is approximately equal to the thickness of the arms of the key. When the fan blade root portion is correctly positioned within the fan hub, the slots in the blade root and hub groove respectively are radially aligned. This permits the arm of the key to simultaneously locate in the slots in the blade root and the slots in the groove of the hub. As a consequence of this, the fan blade root portion is prevented by the key from translating axially relative to the hub.

As can be seen from FIG. 1A, the shear key slot 160 has two flat faces extending in a thickness direction of the blade, the two flat faces are linked by a further flat face extending substantially in the chordwise direction of the blade (if the blade root is curved the flat face intersects two points on a chord line of the root). The corners between the planar faces are curved to reduce the stress concentration. The circumferentially extending face is provided so that the shear key slot arrangement is capable of resisting bird strike impact forces.

Typically the surface of the shear key slot 160 and key 172 is treated to mitigate fatigue failure. An exemplary surface treatment method is laser shock peening. Laser shock peening is an expensive treatment method. Furthermore, care needs to be taken that the corners between the planar faces of the key slot are correctly treated, because the corners are geometrically complicated to treat but are also generally the region of highest stress concentration.

SUMMARY OF INVENTION

The present invention seeks to mitigate one or more of the problems associated with the shear key slot arrangements of the prior art.

A first aspect of the disclosure provides a fan for a gas turbine engine, the fan comprises a hub and an annular array of fan blades mounted to the hub and extending radially outwardly from the hub. Each of the fan blades comprises a blade root. The hub comprises a plurality of hub grooves having a shape complimentary to the shape of the blade root and each hub groove receives and radially retains one blade root. A slot is provided on the suction side and on the pressure side of each blade root. A plurality of keys is provided, each key engages with the slots in one blade root and with the corresponding hub groove so as to axially retain the fan blade. The key comprises two arms and a joining member, the two arms are received in the slots provided on the blade root and the joining member extends between the two arms. An interface is defined between the key arms and the slots in the blade root, and a greater or equal percentage of the interface is curved than is planar.

It is understood in the art that the surface of the slot in the blade root should include a planar section in order for the key and slot arrangement to have the required strength to resist a bird strike impact. In the prior art, this planar section is maximised so as to improve resistance to bird strike by the sides of the slot being planar, and the only curved surface being a smaller radius region connecting between the planar sections.

The present inventors have gone against this prejudice in the art and have surprisingly found that the planar section can be substantially reduced in size or eliminated and still meet the requirements for resisting bird strike impact.

The slot of the first aspect has the advantage that the highest stress concentration is not in a tight corner of the slot (as in the prior art). This means that the geometry is such that the position of the stress concentration is away from the areas that are most difficult to surface treat. In some cases it may not be necessary to surface treat the areas of most challenging geometry.

A further advantage of the slot and key arrangement of the first aspect is that the surface treatment time (e.g. laser shot peening time) can be reduced.

A yet further advantage of the slot and key arrangement of the first aspect is that a wider range of surface treatments are available, for example low plasticity burnishing, which would not be possible with the conventional slot and key design. When using treatment methods employing a tool applying a compressive stress, it may be possible to use a single tool to treat the entire geometry and/or apply a high compressive stress.

In the present application, when directions are defined with respect to the blade, a chordwise direction refers to a direction extending from the leading edge to the trailing edge of the blade. A spanwise direction refers to a direction extending from the blade root to a tip of the blade. A thickness direction refers to a direction extending from a pressure side of the blade to the suction side of the blade.

The surface of the slot and the surface of the key defining the interface between the key arms and the slots may extend substantially in the spanwise direction.

The curvature of the interface may lead to a planar section.

The radius of curvature may be approximately equal to or between 3 and 15 mm. In exemplary embodiments the radius of curvature may be equal to or between 3 and 7 mm.

The interface may have one or more curved sections having a constant and/or a single radius. Alternatively the interface may have one or more curved sections having a varying radius, for example a larger radius leading to a smaller radius.

The transition between a spanwise extending surface of the blade slot and the remainder of the root may be curved. The curvature of the transition region may be greater in a section of the slot that extends generally in the thickness direction than in a section of the slot that extends generally in the chordwise direction of the slot.

An undercut may be provided in each blade root. The undercut may extend between and connect opposing slots in the blade root. The undercut may receive the joining member of the key.

A slot may be provided in the hub groove. The slot may be aligned with the slots in the blade root. The slot in the hub groove may receive a portion of the key.

The slot in the blade root may be surface treated using low plasticity burnishing.

A second aspect of the disclosure provides a fan blade comprising a fan blade root. A slot is provided in the suction side and the pressure side of the fan blade root. The slot may extend through the root in a spanwise direction to define a slot surface. A larger or equal percentage of the slot surface may be curved than planar.

The fan blade of the second aspect may include one or more of the optional features of the fan blade of the fan of the first aspect.

A third aspect of the disclosure provides a fan blade comprising a fan blade root. A slot is provided in the suction side and the pressure side of the fan blade root. The slots may extend through the root in a spanwise direction to define a slot surface, and wherein the slot surface includes a curved portion having a radius of approximately 3 to 7 mm.

The fan blade of the third aspect may include one or more of the optional features of the fan blade of the fan of the first aspect.

A fourth aspect of the disclosure provides a fan blade comprising a fan blade root. A slot is provided in the suction side and the pressure side of the fan blade root. The slot extends through the root in a spanwise direction to define a slot surface, and wherein a larger percentage of a portion of the slot extending in the chordwise direction is curved than planar.

The fan blade of the fifth aspect may include one or more of the optional features of the fan blade of the fan of the first aspect.

A fifth aspect of the disclosure provides a method of manufacturing a fan blade having a blade root. The method comprises providing a slot in the blade root; and surface treating the slot using low plasticity burnishing.

The fan blade may be a fan blade of the fan of the first aspect, and/or a fan blade of the second, third and/or fourth aspects.

DESCRIPTION OF DRAWINGS

The invention will now be described, by way of example only, with reference to the accompanying drawings in which.

DETAILED DESCRIPTION

Figure 2:
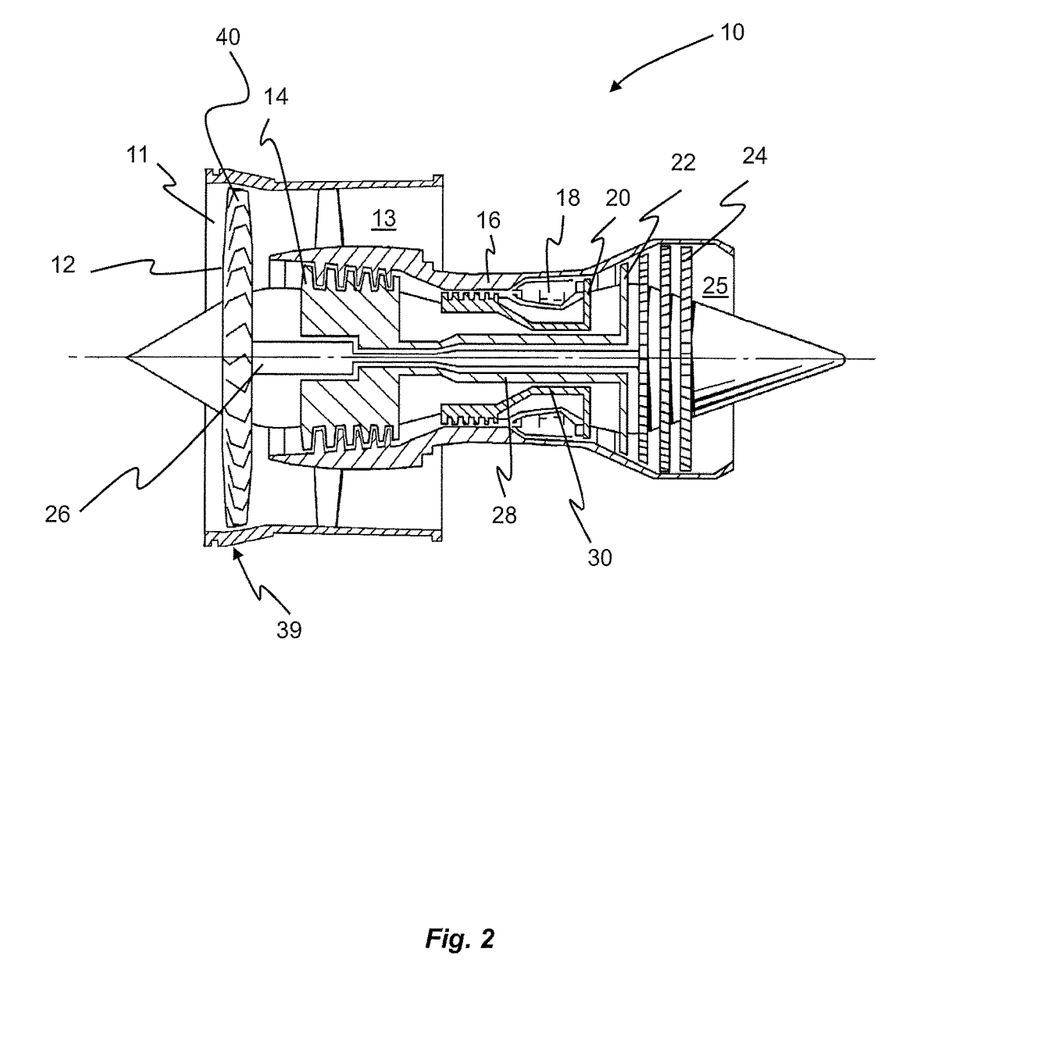
FIG. 2 illustrates a cross section of a gas turbine engine.

With reference to FIG. 2 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted.

Figure 3:
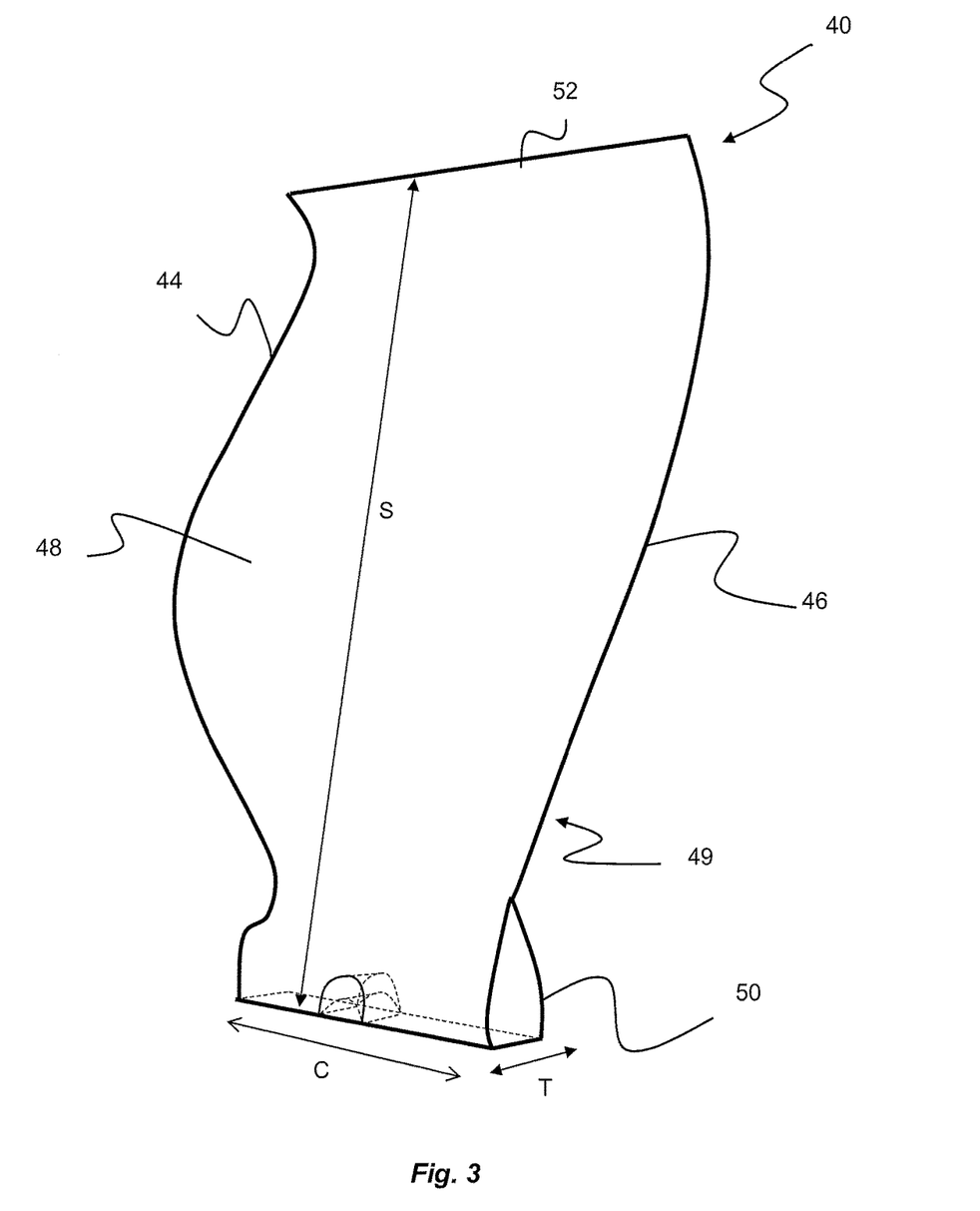
FIG. 3 illustrates a perspective view of a fan blade of the gas turbine engine of FIG. 2.

Referring to FIG. 3, the fan blades 40 each comprise an aerofoil portion having a leading edge 44, a trailing edge 46, a concave pressure surface 48 extending from the leading edge to the trailing edge and a convex suction surface 49 extending from the leading edge to the trailing edge. The fan blade has a root 50 via which the blade can be connected to the hub. The root 50 has a dovetail shaped cross section. The fan blade has a tip 52 at an opposing end to the root. The fan blade may also have an integral platform (not shown in FIG.

2) which may be hollow or ribbed for out of plane bending stiffness. In the present embodiment the fan blade is a metallic fan blade.

In the present application, a chordwise direction C is a direction extending between the leading edge and the trailing edge; a spanwise direction S is a direction extending between the tip of the blade and the root 50 of the blade 40; and the thickness direction T is a direction extending between the pressure surface 48 and the suction surface 49 of the blade 40.

Figure 4:
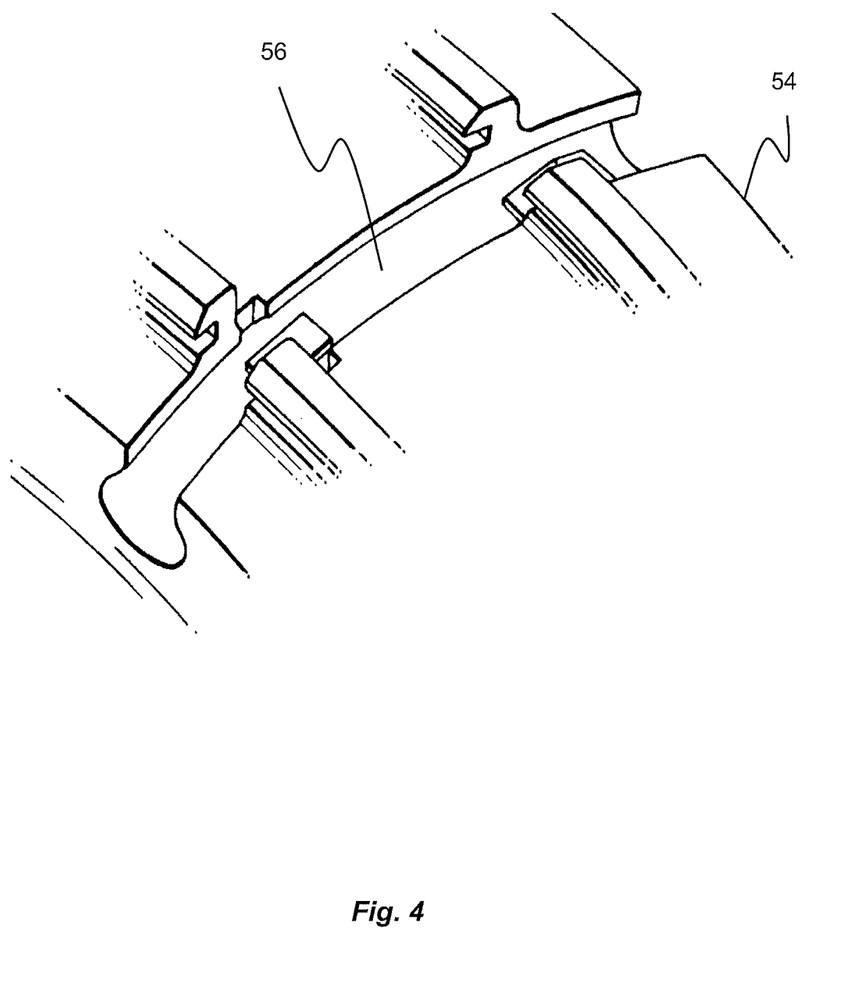
FIG. 4 illustrates a partial perspective view of a hub of the fan of the gas turbine engine of FIG. 2.

Referring now to FIG. 4, a portion of the hub 54 is shown. The hub includes a plurality of grooves 56. In the present embodiment the grooves extend in an axial direction, but in alternative embodiments the grooves may be angled to the axial direction and/or may be curved. The grooves have a dove tail shaped cross section, which is complimentary to the shape of the blade root.

Figure 5A:
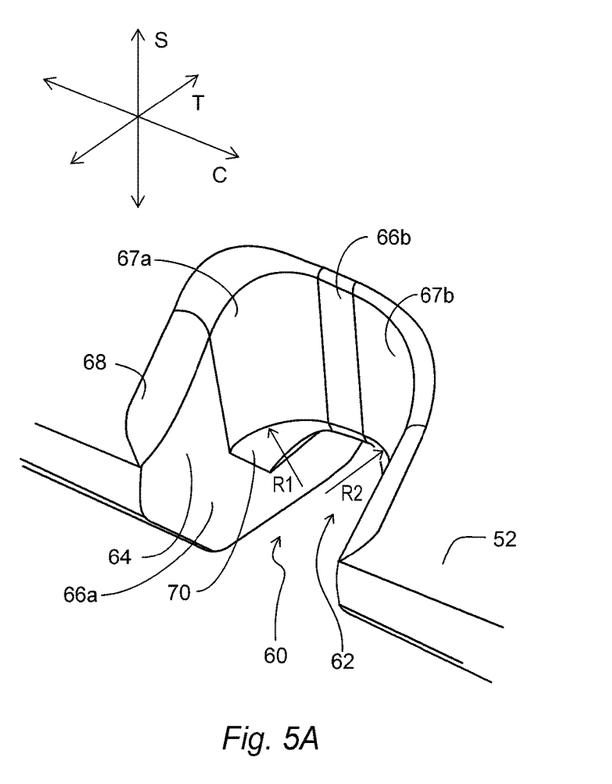
FIG.5A illustrates a perspective view of a slot formed in a root of the blade of FIG. 3.
Figure 5B:
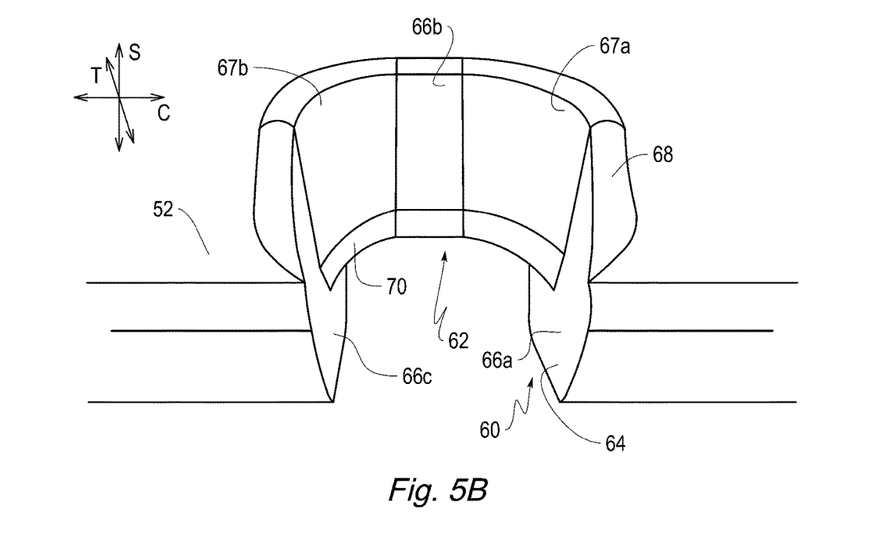
FIG. 5B illustrates another perspective view of a slot formed in a root of the blade of FIG. 3.

A slot 60 is provided in the blade root 50 as seen from the pressure side of the blade (as shown in FIG. 5A) and the suction side of the blade (as shown FIG. 5B An undercut 62 is provided in the blade root and extends between and connects the slots 60.

As can be seen in FIGS. 5A and 5B, the slot 60 cuts into the root in the thickness direction T of the root and extends entirely through the root (in the region of the slot) in the spanwise direction. The slot on the pressure side of the blade root extends from the pressure side towards the suction side. The slot includes a surface 64 extending substantially in the spanwise direction S. The surface 64 is substantially an inverted U shape in plan view, that is the surface 64 extends from the pressure side towards the suction side, the surface then curves in a generally chordwise direction C before curving back towards the pressure side of the blade root.

The majority of the surface 64 is curved in a plane defined by the thickness direction T and the chordwise direction C (e.g. the majority of the surface 64 is curved when viewed in plan view as shown with curved sections 67a and 67b). The sections 67a and 67b of the surface 64 extending from the pressure side end of the slot towards the suction side end of the slot have a curvature R1 R2 respectively, of approximately 3 to 7 mm, but this curvature can vary depending on given loading requirements and blade geometry.

The surface 64 includes planar section 66a, 66b and 66c. The planar section 66b extends substantially in the chordwise direction of the blade root 50. The planar section 66b is much smaller in extent than the comparable planar section of the prior art, due to the curvature of the remainder of the surface 64. Indeed, the majority of the surface 64 of the slot 60 is curved, as opposed to slots of the prior art where the majority of the slot is planar.

The upper edge 68 of the slot 60 are rounded. That is, the transition between the surface 64 of the slot and the outer surface of the root 50 is curved. The curvature of the edge 68 is larger in the region where the surface extends from the pressure side to the suction side than in the region where the surface extends in the chordwise direction.

The transition between the slots 60 and the undercut 62 is curved (the curved region is labelled 70). In the present embodiment, the transition has a curvature of approximately 3 to 8 mm, but it will be appreciated that any suitable curvature may be selected.

The slot on the suction side of the fan blade has a similar profile as the slot on the pressure side, but is a mirror image.

The shape of the slot 60 means that the slot does not have tight corners, as compared to the slots of the prior art, which aids with surface treatment of the slot. Surprisingly, when tested the blade having the described root configuration (and using the key as will be described later) was able to resist bird strike impact. It is commonly understood in the art that the planar portion of the slot needs to be much larger than that of the described embodiment (feature 66) to resist bird strike impact, but the present inventors have unexpectedly found this not to be the case.

Figure 6:
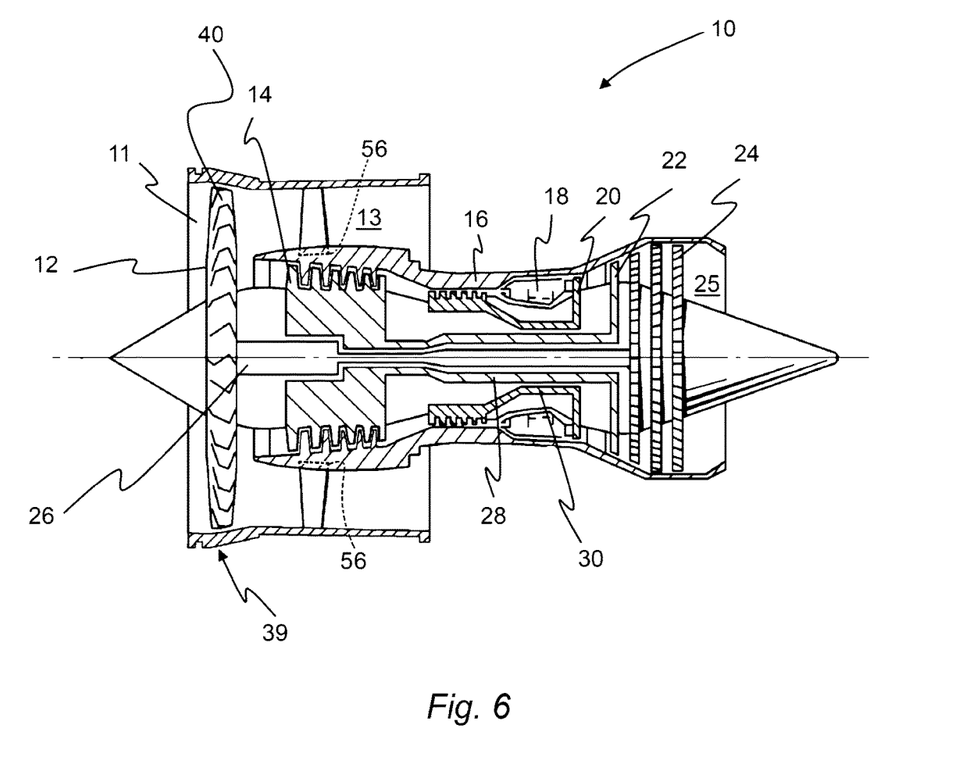
FIG. 6 illustrates a perspective view of a key for use with the slot of FIG. 5.

Referring now to FIG. 6, the key 72 is shown in more detail. The key includes two arms 74 and a joining member 76 extending between the two arms. The arms and the joining member form a substantially U-shaped key. The shape of the key is complimentary to the slots 60 and undercut 62 on the blade root, so that the arms and joining member of the key can be at least partially received in the slots and undercut.

The arms 74 of the key 72 each include a surface (referred to from hereon in as the inner surface) that interfaces with the slot. The inner surface is shaped so that a larger percentage of said surface is curved than planar. As can be seen the inner surface of the arms curve in a direction towards the opposing arm (i.e. in the thickness direction when connected to the blade root). At a position proximal to the opposing arm the inner surface includes a planar portion. The planar portion is much smaller than the comparable planar portion of the prior art. As is apparent from FIGS. 5 and 6, the inner surface of the arms 74 of the key 72 follows the profile defined by the surface 64 of the slot 60.

The joining member 76 has substantially planar surfaces. A curved region 78 provides a transition from the inner surface of the arms 74 to the joining member. The joining member is thinner in width than the arms (similar to the undercut 62 which is thinner in width than the slots 60). A portion of the side walls of the key 72 that transition from the joining member to the arms is curved.

To manufacture the fan blade, the blade is formed in the usual way using techniques known in the art. The blade may be manufactured with the slot 60 in the blade root or the slot 60 may be machined into the blade. The slot 60 is then surface treated to improve fatigue performance.

Figure 7:
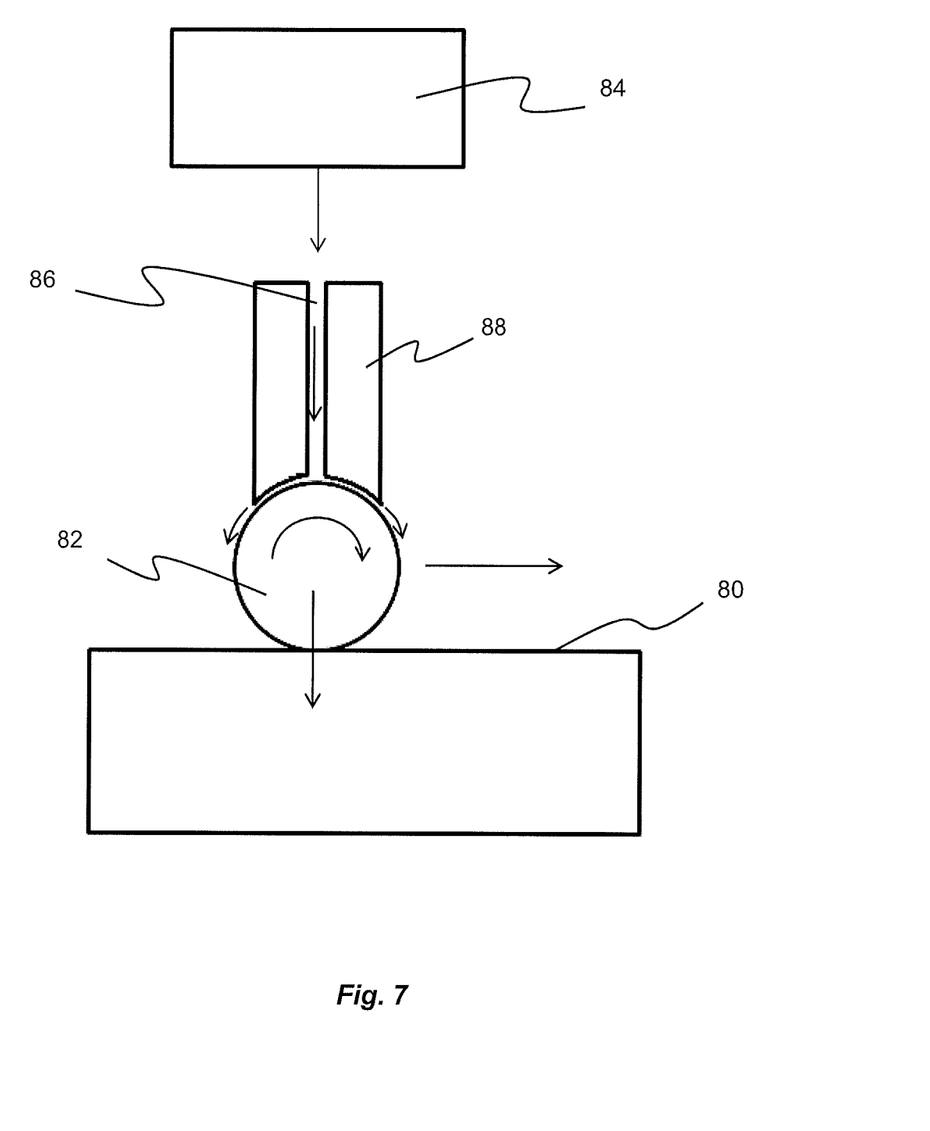
FIG. 7 illustrates a schematic view of an arrangement used for low plasticity burnishing.

In the present embodiment the slot 60 is surface treated using low plasticity burnishing. The process of low plasticity burnishing is illustrated in FIG. 7. As can be seen in FIG. 7, to low pressure burnish a surface 80 (such as the surface 64 of the slot 60) a ball element 82 (or other type of rolling element) is rolled along the surface 80. During the rolling of the element 82 a compressive pressure is applied to the surface 80 using hydraulic pressure. A hydraulic pump 84 supplies a fluid (usually oil based) through a central channel 86 of a burnishing tool 88. The ball element 82 is provided at an axial end of the burnishing tool and the fluid flows from the central channel 86 around the ball element, such that the ball element does not directly contact the burnishing tool during operation.

Low plasticity burnishing is generally a faster and cheaper surface treatment process than the conventional method of laser peening. To the inventors knowledge, it is not currently possible to effectively use low plasticity burnishing to treat slots of the prior art blade roots because it is not possible to get the ball element 82 into the tight corners of the slot. This is of particular importance because in blade slots of the prior art the tight corners are the regions of the highest stress concentration.

In alternative embodiments, laser peening could be used to treat the surface of the slot 60 of the described embodiment. If laser peening is used, in many cases, the peening time can be reduced compared to the slots of the prior art.

When treating the surface of the slot 60, it may be possible, depending on loadings for a specific application, to not treat the regions of the smallest radius (i.e. the transition between the planar region and the curved region), which would further reduce treatment time and complexity. It is possible to not treat said regions because the critical regions in terms of stress have been moved away from the regions of most complex geometry.

It will be appreciated by one skilled in the art that, where technical features have been described in association with one or more embodiments, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

The described fan blade is a metallic fan blade, but in alternative embodiments the fan blade may be a composite fan blade.

In the present embodiment the planar surface is flat, e.g. if the root of the blade is curved the planar surface intersects the chord of the blade at two points and deviate from the chord for the remainder of the surface. Alternatively, the planar surface may follow the general chordal direction of the root. In further alternative embodiments the slot may not include a planar section and instead the entirety of the surface of the slot that interfaces with the key arm may be curved.

The invention claimed is:

1. A fan for a gas turbine engine comprising:
   a hub defining a plurality of grooves and a plurality of keys, one of the plurality of keys respectively disposed in each of the plurality of grooves;
   an annular array of fan blades, each fan blade including a blade root, each blade root being receivably mounted in a corresponding groove of the plurality of grooves so as to be radially retained therein and fitted to a corresponding key of the plurality of keys;
   each blade root having a bottom surface defining a generally U-shaped slot, the U-shaped slot extending along the bottom surface from a pressure side to a suction side of each blade root and opening out at the pressure side and the suction side of each blade root;
   each key of the plurality of keys is formed in a U-shape so as to be at least partially fitted respectively in each generally U-shaped slot when the blade root is receivably mounted in the corresponding groove of the hub; and
   each U-shaped slot being formed from a plurality of planar sections and a plurality of curved sections defined in the blade root, the plurality of planar sections including a first planar section, a second planar section and a third planar section, the second planar section being positioned at a deepest portion of each U-shaped slot intermediate the first planar section and the third planar section, and when each U-shaped slot is viewed in cross section along a length of each blade root in a chordwise direction of each blade root, each first planar section, second planar section and third planar section has a cross-sectional peripheral dimension being a length in the chordwise direction or a height generally perpendicular to the chordwise direction,
   wherein, for each generally U-shaped slot, at least one of:
   (i) the cross-sectional peripheral length in the chordwise direction of the second planar section is less than at least one of the cross-sectional peripheral height of the first planar section or the cross-sectional peripheral height of the third planar section, or
   (ii) the plurality of curved sections each have a respective cross-sectional peripheral dimension having a radius of curvature, and the total cross-sectional peripheral dimension of the radius of curvatures of the plurality of curved sections is greater than the total cross-sectional peripheral dimension of the plurality of planar sections.

2. The fan according to claim 1, wherein the radius of curvature of each curved section of the plurality of curved sections is equal to or between 3 and 15 mm.

3. The fan according to claim 1, wherein surfaces of each blade root that define each U-shaped slot are surface treated using low plasticity burnishing.

* * * * *